United States Patent
Ribordy et al.

(10) Patent No.: US 11,327,565 B1
(45) Date of Patent: May 10, 2022

(54) NAIL MANICURE TIPS FOR ENABLING USE OF A TOUCHSCREEN DEVICE, AND METHOD THEREFOR

(71) Applicants: Sylvia Ribordy, Plano, TX (US); Malissa Malugani, Plano, TX (US)

(72) Inventors: Sylvia Ribordy, Plano, TX (US); Malissa Malugani, Plano, TX (US)

(73) Assignee: TIPS-E TIPS LLC, Plano, TX (US)

( * ) Notice: Subject to any disclaimer, the term of this patent is extended or adjusted under 35 U.S.C. 154(b) by 782 days.

(21) Appl. No.: 16/154,586

(22) Filed: Oct. 8, 2018

(51) Int. Cl.
*A45D 29/00* (2006.01)
*G06F 3/01* (2006.01)
*G06F 3/041* (2006.01)

(52) U.S. Cl.
CPC .......... *G06F 3/014* (2013.01); *A45D 29/007* (2013.01); *G06F 3/0412* (2013.01); *G06F 2203/0331* (2013.01)

(58) Field of Classification Search
CPC ................. A45D 29/007; A45D 29/22; A45D 2029/008; A45D 2200/1036; A61Q 3/04; G06F 3/014; G06F 3/0412; G06F 2203/0331
USPC ............................................................ 2/163
See application file for complete search history.

(56) References Cited

U.S. PATENT DOCUMENTS

| | | | |
|---|---|---|---|
| 6,367,485 B1* | 4/2002 | Dutton-Davis | A45D 29/007 132/200 |
| 9,055,801 B1* | 6/2015 | Schuch | A45D 29/007 |
| 2010/0083974 A1* | 4/2010 | Milican | A45D 29/007 132/73 |
| 2011/0284017 A1* | 11/2011 | Nakamura | A45D 31/00 132/73 |
| 2013/0074859 A1* | 3/2013 | Horvath | A45D 29/007 132/73.5 |
| 2014/0007894 A1* | 1/2014 | Gagnon | A45D 29/007 132/200 |
| 2014/0320453 A1* | 10/2014 | Vellanki | G06F 3/03545 345/174 |
| 2015/0013709 A1* | 1/2015 | Scheurn | A45D 29/007 132/200 |
| 2019/0254403 A1* | 8/2019 | Biddle | A45D 34/041 |

* cited by examiner

*Primary Examiner* — Rachel R Steitz
(74) *Attorney, Agent, or Firm* — Shackelford, Bowen, McKinley & Norton, LLP; David L. Odom

(57) ABSTRACT

A cotton strip is adhered to a piece of aluminum foil, and aluminum foil is wrapped onto a mold simulating a finger, with the cotton strip on an interior side of the foil. Self-adherent fabric is wrapped around the foil on the mold. The self-adherent fabric is then treated with an electrically conductive solution, such as an electrolyte. The tip, including cotton, foil, fabric, and solution, is then formed into a sealed electrically conductive tip ready for use. At the time of use, acetone is applied to the cotton strip via a dropper or comparable mechanism, and the tip is placed on a finger to initiate the removal of nail polish, gel nail polish, or a nail overlay from a natural fingernail. The removal process enables use of a cell phone or other device with a touchscreen during the process.

10 Claims, 8 Drawing Sheets

NAIL MANICURE TIPS FOR ENABLING USE OF A TOUCHSCREEN DEVICE, AND METHOD THEREFOR

TECHNICAL FIELD

The invention relates generally and primarily to fingernail manicures and, more particularly, to a system and method for enabling use of a touchscreen device while having nail polish, gel polish, and artificial nail overlays removed from natural fingernails.

BACKGROUND

Finger nails affect a person's appearance. To improve one's appearance, a person, referred to herein in the context of a nail salon as a "customer," may get a manicure wherein polish is applied to their nails, or artificial overlays are adhered to their nails. After a period of time, though, the polish and/or overlay must be removed.

Conventionally, gel polish and artificial overlays are removed by filing off the shiny top coat, soaking a piece of torn cotton in acetone, placing it on the client's fingernail, and then wrapping the fingertip in a piece of aluminum foil. The acetone is allowed to soak on the nail for ten to twenty-five minutes and is then checked for progress. If the polish/product has not fully soaked off, more acetone is added to the cotton, and the nail tip is rewrapped. If the foil was torn or damaged while checking the progress, a new piece of cotton is saturated in acetone, placed on the fingernail, and rewrapped with a new piece of foil.

During the process of removing polish and/or overlays from a customer's nails, the customer cannot use a cell phone or anything that requires touching a touch screen device (e.g., a laptop or tablet). If the customer gets a call or text during this time, he or she will not be able to answer the call or respond to the text/email without getting the attention of the nail technician to assist them with their phone. This often irritates the nail technician as it distracts/interrupts them from performing other tasks related to a customer's manicure, and it hinders their productivity and efficiency. If the customer is an individual who needs to multi-task at virtually all times (e.g., a business owner, working professional, mother, etc.), that customer can't afford to miss or not respond to any important calls/texts/emails even for such a relatively short time period. Other customers may just want to use their phone/device for entertainment as they wait for the soak process to complete.

Another problem with removing gel polish, and/or overlays is that a cell phone may be vulnerable to nail debris and removal products used during the polish and artificial overlay removal process. More specifically, to prep the nail for the removal of polish or an overlay, a shiny top coat is filed off, often using an electric file drill which sprays nail dust and debris all over one's hands, clothes, and phone. If a customer needs to answer a phone, send a text, or respond to an email for any reason during this time, he or she will not be able to do so without risking getting nail dust on their phone, or damaging their phone with acetone.

A further problem with the removal of gel polish, and/or nail overlays is that acetone can leak onto the customer and/or technician. With the current process, cotton is soaked in acetone, placed on the nail, and loosely wrapped in foil. As soon as a customer lifts his hand to use their phone, wipe a hair off their face, or simply scratch their nose, the acetone runs down their hand. This can damage the customer's clothing or cell phone. If the technician assists the customer with their phone, the acetone can also drip on the technician's clothing.

While it would be desirable to solve the foregoing problems, currently, there is no product on the market that can remove gel polish or artificial overlays, particularly not while allowing use of a cellphone or touchscreen device(s) during the soak off (removal) process. In addition, there is no product currently available that protects a phone from nail dust, acetone, or from getting wet while nails are being done. Nor is there a product that prevents leakage from the cotton-soaked acetone required to remove the polish and overlay products.

If a person does their own nails, e.g., at home, they have a few options available: (1) They may use the above foil and saturated cotton option; (2) They may soak their fingers in a warm bowl of acetone for thirty to forty-five minutes; or (3) They may buy foil packets, clips, and rubber caps to soak off gel polish. However, none of these options allows the user to use their phone, or perform simple household duties while waiting for polish to soak off, nor do they protect a phone during the process.

Some of the shortcomings of the prior art may be summarized as follows:

There is not a current method for protecting a phone's surface from dust or damaging chemicals.

The prior art merely uses a piece of foil and a soaked cotton ball loosely wrapped around ten fingers with the client sitting unable to do anything while their fingers are wrapped up for anywhere from ten to twenty-five minutes.

The prior art prevents one from using touchscreen features on a phone to, for example, answer the phone, text, or the like, because bulky foil is not accurate, it scratches the phone's surface, and allows acetone to drip down one's hand, arms, clothes and phone.

In a salon, clients that must tend to their phones must do so with the assistance of a nail technician which is often frowned upon by the technician, as the interruption often interferes with their productivity and efficiency.

If polish is not completely soaked off at the allotted time, a technician may have to rewrap a finger with a new foil and new saturated cotton.

Technicians must expose their finger and skin to acetone repeatedly throughout the day since the prior art requires dipping, soaking, or saturating the cotton, and then directly applying acetone to a client's nail.

In view of the foregoing, it is apparent that there are no nail polish, gel polish and/or nail overlay removal products on the market that will allow a customer to use their touchscreen device (e.g., smart phone) while waiting for the polish or overlay product to soak off, as well as to protect their device from nail dust, acetone and from getting wet. Further, conventional methods are bulky and often leak acetone, making it messy, and leaving a person unable to do anything while they wait. The shortcomings described herein apply to individuals who have their nails done at salons as well as those who choose to do their own nails at home.

Therefore, what is needed is a system and method for removing nail polish, gel polish, and/or nail overlays while allowing a customer to still use their phone or other touchscreen device. Such systems and methods should, among other things, also protect a phone or other touchscreen device from nail dust, acetone, and from getting wet, and not be bulky or leak acetone.

SUMMARY

The present invention, accordingly, provides an electrically conductive tip that is used to soak off nail polish, gel polish, and/or artificial overlays while simultaneously allowing use of a touchscreen device(s). A custom fit protective phone cover is preferably also included. In one embodiment, the electrically conductive tip is achieved by adhering a cotton strip to a piece of aluminum foil, and wrapping the aluminum foil onto a mold simulating the shape and size of a fingertip, with the cotton strip on an interior side of the foil where a nail would be. Alternatively, the cotton is positioned over the portion of the mold where a nail would be, and then the foil is wrapped around the mold, securing the cotton in place. Self-adherent fabric—treated with an electrically conductive solution (e.g., a polar solvent, such as water, into which an electrolyte, such as salt, is dissolved)—is wrapped, preferably stretched, around the foil and cotton combination, then molded to form an electrically conductive tip. These steps are then preferably repeated for making ten tips, one for each of ten fingers. At the point of use, the ten electrically conductive tips are placed on the person's ten fingers, and acetone is transferred, preferably via a dropper, onto the cotton strip, thereby initiating the process of removing the gel polish, nail polish, or nail overlays from natural fingernails.

In an alternate embodiment, the self-adherent fabric is not required to be treated with an electrically conductive solution, but rather a cap is placed over the fabric (wrapped around the cotton and foil) The cap being sized and shaped like a closed top thimble to fit over the fabric and made from an electrically conductive material, such as electrically conductive rubber or silicon. In a further alternate embodiment, self-adherent fabric is fabricated using electrically conductive threads, electrically conductive stickers, electrically conductive paint, and/or electrically conductive ink thereby obviating the need for treatment with an electrically conductive solution.

In a still further embodiment, a sock is made of electrically conductive fabric and is sized and preformed to fit over cotton and aluminum foil already wrapped around a finger.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Additionally, dimensions are provided by way of example, but not limitation. Thus, the present invention is not intended to be limited to the embodiments and/or dimensions shown, but is to be accorded the widest scope consistent with the principles and features disclosed herein. Additionally, as used herein, the term "substantially" is to be construed as a term of approximation.

Figure 1:
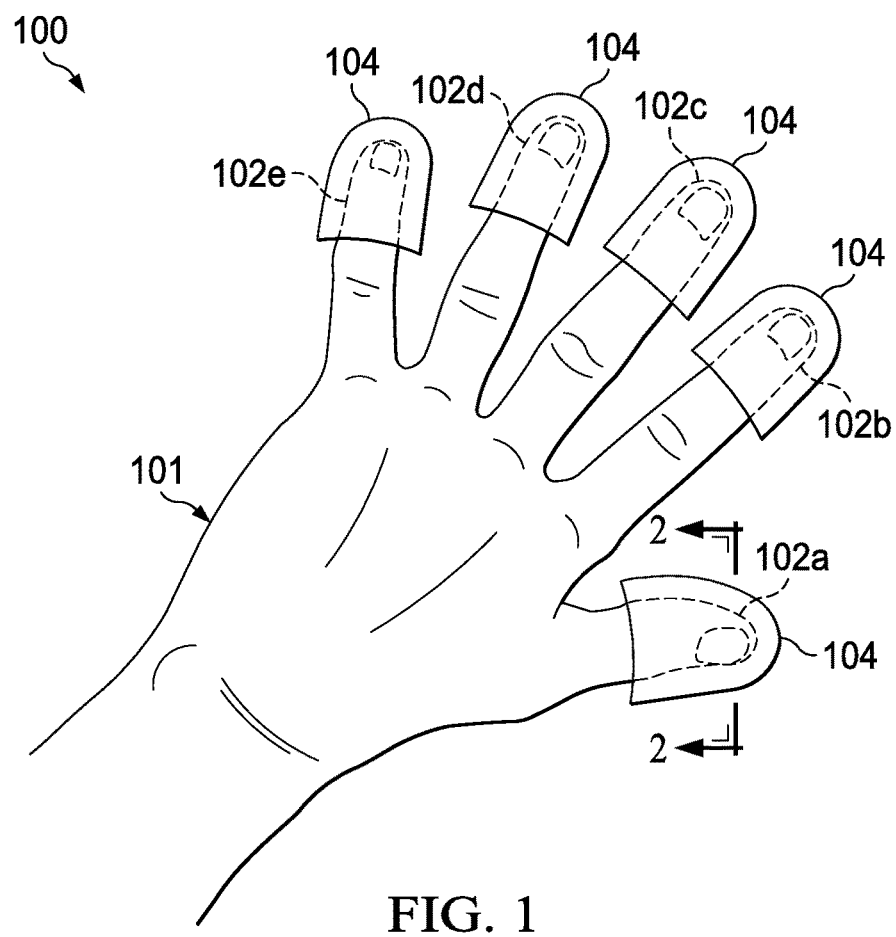
FIG. 1 exemplifies a hand with tips on each finger soaking off nail polish, gel polish or artificial overlays.

Referring to FIG. 1 of the drawings, the reference numeral 100 generally designates a hand 101 having tips 104 embodying features of the present invention for soaking gel polish or artificial overlay off of each finger 102a, 102b, 102c, 102d, and 102e, collectively referred to herein as fingers 102. The tips 104 are preferably moistened with an electrically conductive solution 107 discussed in further detail below.

Figure 2:
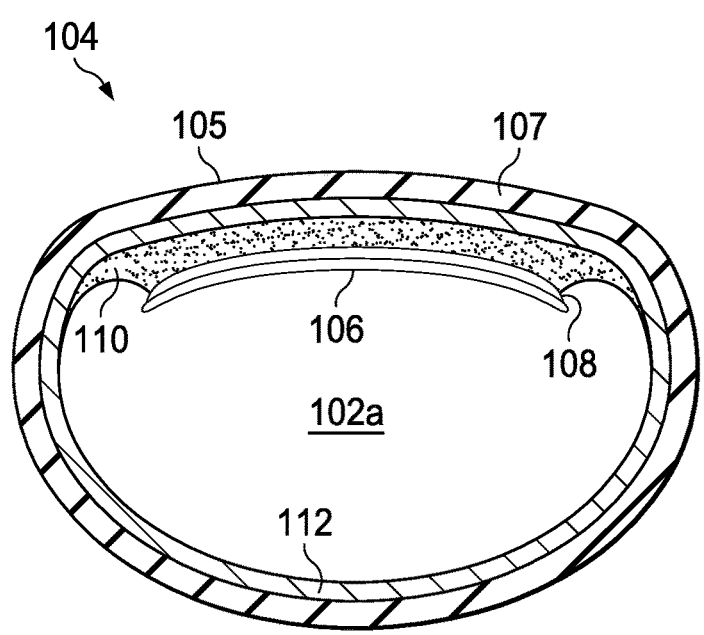
FIG. 2 depicts a cross-section of a tip taken along line 2-2 of FIG. 1.
Figure 3:
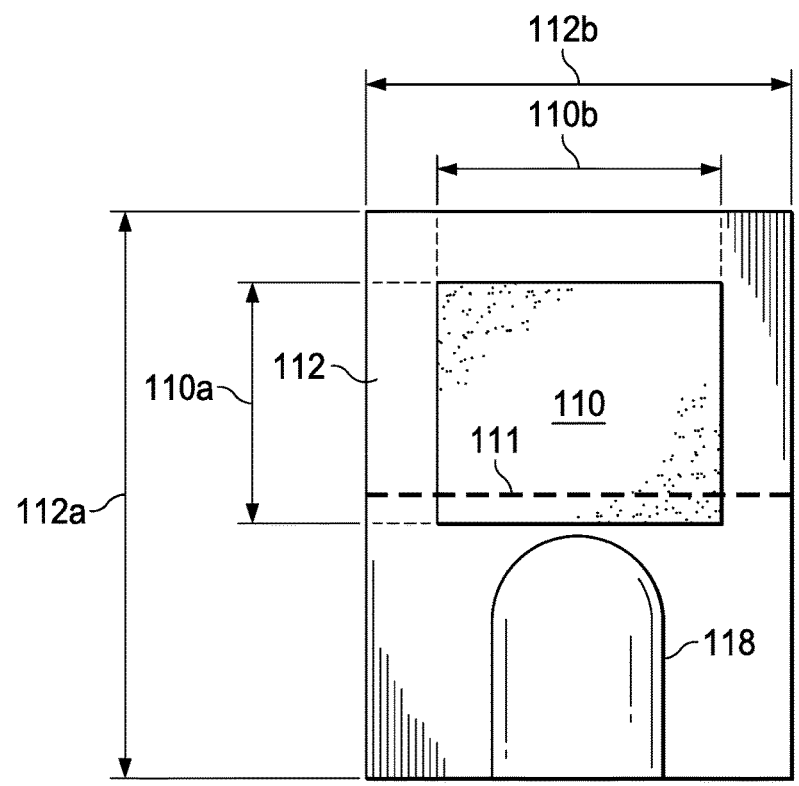
FIG. 3 exemplifies a cotton strip and mold positioned on the foil.
Figure 4A:
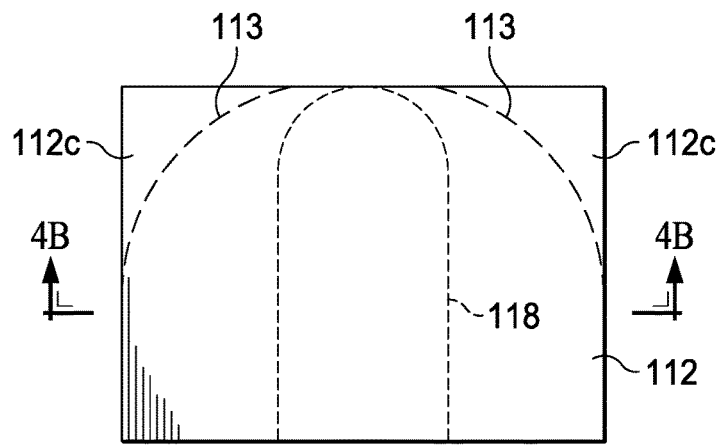
FIG. 4A exemplifies the foil and cotton strip of FIG. 3 folded over the mold, preferably using adhesive to keep the cotton strip and foil in place once it is folded.
Figure 4B:
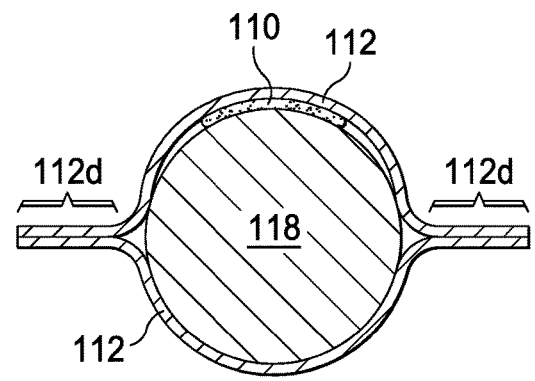
FIG. 4B is a cross-section of the foil and cotton strip of FIG. 4A taken along the line 4B-4B of FIG. 4A.
Figure 5A:
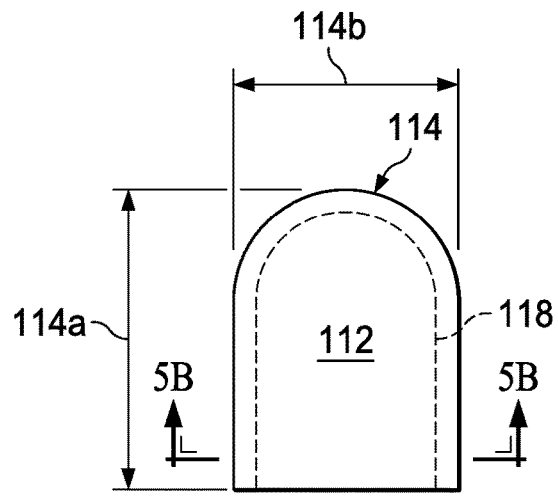
FIG. 5A shows the top ends of the foil preferably trimmed and wrapped around the mold.
Figure 5B:
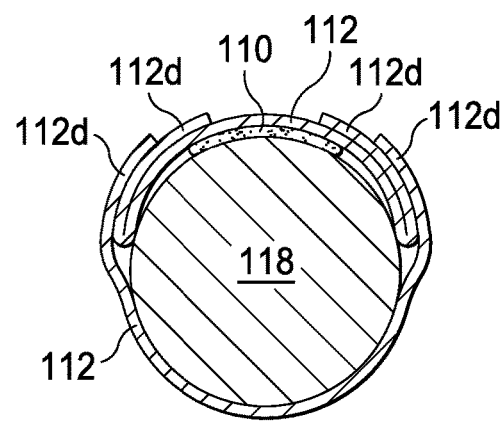
FIG. 5B shows a cross-section of FIG. 5A, taken along the line 5B-5B of FIG. 5A, with foil edges folded up.

FIG. 2 is a cross-section of a tip 104. Tip 104 includes a strip of cotton 110, or comparable absorbent material, configured to be positioned over nail polish, gel polish or artificial nail overlay 108, adhered to a natural nail 106. Cotton 110 is preferably soaked in acetone, and may alternatively comprise any material effective for absorbing acetone. Foil 112, such as aluminum foil, is wrapped around acetone-soaked cotton 110 and finger 102 and the polish, gel polish, or artificial nail overlay 108 to prevent the acetone from evaporating. Aluminum foil 112 preferably has a thickness such that it is thin enough to wrap smoothly around a fingertip, but thick enough to not easily tear. A foil thickness of preferably about 0.016 inches has been found to work well. It has also been found that foil having dimensions of about 3×4 inches is preferred. Alternatively, Mylar® (biaxially-oriented polyethylene terephthalate) or a combination of Mylar fused with aluminum may be used in place of aluminum. A self-adherent wrap or fabric 105 is wrapped around foil 112, and is preferably moistened with an electrically conductive solution, described in further detail below. The wrapping of aluminum foil 112 and fabric 105 are shown in greater detail below in FIG. 8B. It can be appreciated that fabric 105 helps prevent leakage of acetone, and foil 112 helps the process work faster by creating an insulating heating effect (from acetone reacting with the polish) that aids in penetrating the gel polish or artificial nail overlays.

It can be appreciated that tips 104 can be premade/preformed using a mold, or can be made on the spot as needed for a snugger fit around a person's finger which would be effective to prevent acetone leakage. The former will be described below as a preferred embodiment since it is considered simpler to use.

FIGS. 3-8B depict a sequence of steps for making the invention of FIGS. 1 and 2, according to one embodiment of the invention. Accordingly, in FIG. 3, aluminum foil 112 is laid out, having a length 112a of about 4 inches and width 112b of about 3 inches. Cotton 110 is preferably not a cotton ball, but rather a relatively thick (e.g., 1/16 inches thick) and absorbent strip, having a length 110a of about 1.75 inches and a width 110b of about 1.5 inches, and is positioned on foil 112, substantially in an upper half of foil 112, as viewed in FIG. 3. Cotton strip 110 is preferably secured thereto with adhesive or double-sided tape. A mold 118, about the size of a finger 102, is positioned on a lower portion (as viewed in FIG. 3) of aluminum foil 112 and the foil is folded over the mold along dashed line 111, resulting in the configuration of FIG. 4A. Aluminum foil 112 is then preferably trimmed along lines 113 to minimize bulkiness, and portions 112c are removed from foil 112. As shown in FIG. 4B, edges 112d of foil 112 are pressed together and, as shown in FIG. 5B, are wrapped upwardly about mold 118 (on the cotton side of the mold) to produce the combination shown in FIG. 5A, to form a smooth foil tip 114 having a length 114a of about 2 inches, and a width or diameter of about 0.75 inches.

Figure 6:
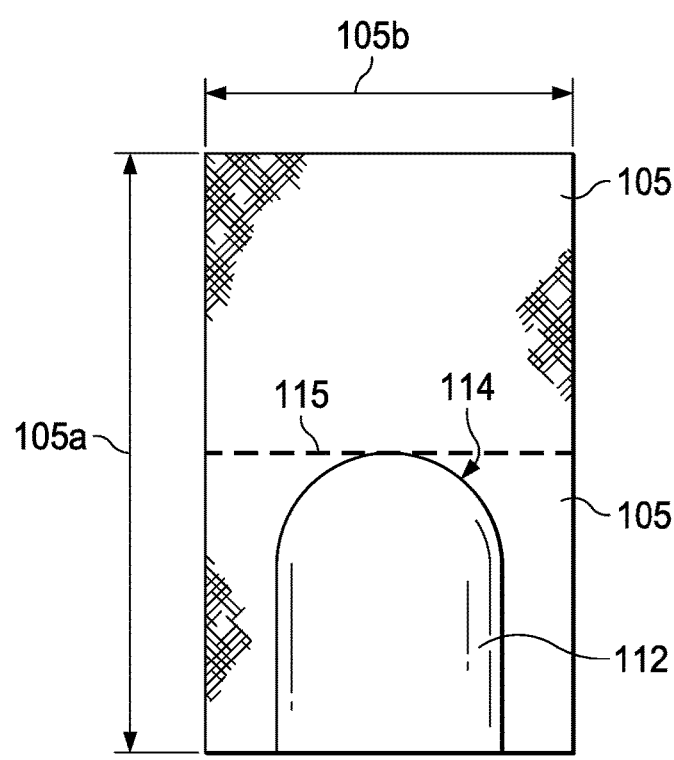
FIG. 6 shows a foil tip placed on the bottom half of the fabric.
Figure 7A:
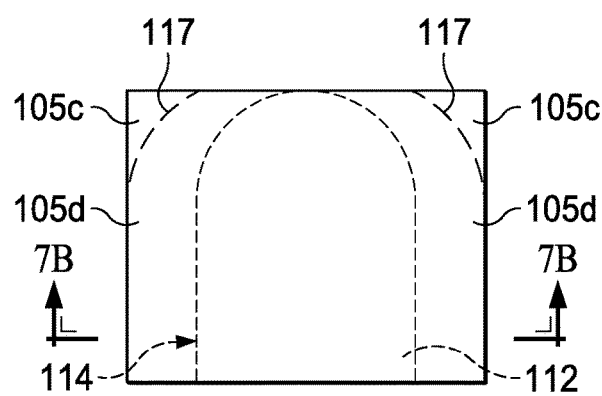
FIG. 7A shows a foil tip of FIG. 6 with the fabric folded approximately half way over the foil tip.
Figure 7B:
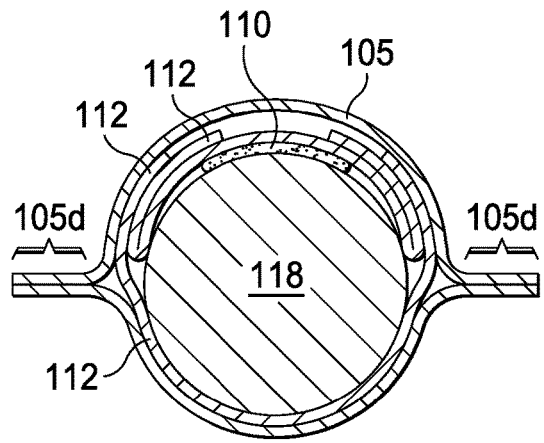
FIG. 7B is a cross-sectional view of the tip of FIG. 7A taken along the line 7B-7B of FIG. 7A.

In FIG. 6, the foil tip 114 is preferably positioned on a lower half (as viewed in FIG. 6) of self-adherent fabric 105 having a length 105a of about 4 inches and a width 105b of about 1.5 inches. Fabric 105 is preferably stretchable and is cut with the stretch horizontal (as viewed in FIG. 6) to the foil tip to accommodate different finger sizes. Fabric 105 is then folded over at dashed line 115 resulting in the configuration of FIG. 7A. Fabric 105 corner portions 105c are preferably trimmed at dashed lines 117. Edges 105d of fabric 105 are then pressed together as shown in FIG. 7B and smoothly wrapped around foil tip 114 to lay flat on the same side of tip 104 as cotton strip 110, as shown in the cross-section of FIG. 8B, to thereby seal the fabric together and form tip 104 shown in FIG. 8A. The tip surface opposite cotton 110 is preferably flat so that it can be used to glide across a touch screen, such as a smart phone (not shown).

Figure 8A:
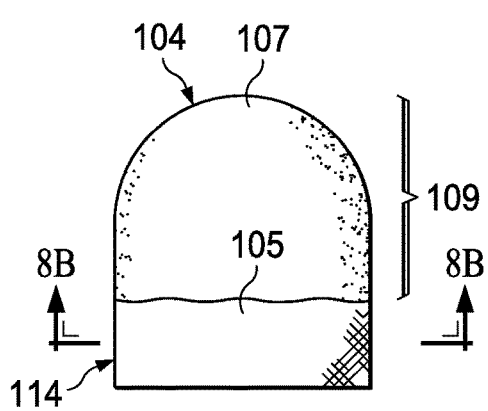
FIG. 8A depicts the final tip covered with an electrically conductive solution.
Figure 8B:
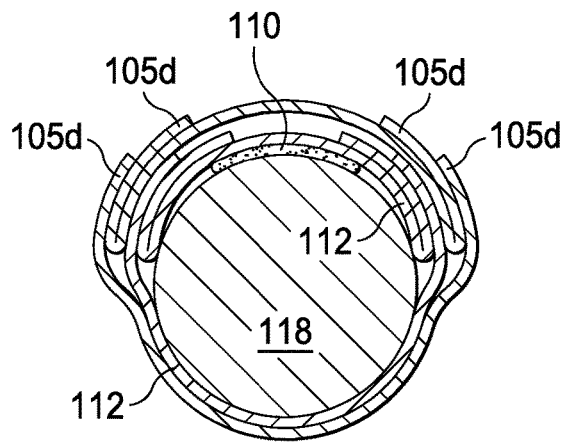
FIG. 8B shows a cross-section of FIG. 8A, taken along the line 8B-8B of FIG. 8A, with fabric edges folded up.

With reference to FIG. 8A, an end portion 109 of tip 104 is treated with an electrically conductive solution 107. The conductive solution preferably also acts as a moisturizing solution that is safe on skin, and preferably works with heat generated by fingers. In one preferred embodiment, the electrically conductive solution comprises a polar solvent, such as water, into which an electrolyte, such as salt, is dissolved. The conducting solution may further include one or more of glycerin, mineral oil, aloe vera, hyaluronic acid, caprylic, cetearth 20, cetyl alcohol, steric acid, cetearyl alcohol, polydimethylsiloxane, phenoxyethanol, cobomer, sodium hydroxide, sodium citrate, citric acid, sodium pca, NaCl sodium chloride, methylparben, propylparben, and ethylparaben.

Once end portion 109 has been treated with the electrically conducting solution, mold 118 may be removed from tip 104, or it may be left in the tip to maintain form until the tip is placed on a finger. It may be appreciated that the foregoing steps of assembly may be performed on a finger as well as a mold. Alternatively, some steps may be performed on a finger and some steps may be performed on a mold. For example, the cotton and foil may be formed on a finger, and fabric treated with electrically conductive solution and formed separately on a mold may be subsequently added to the aluminum/cotton assembly.

In operation, a dropper (not shown) is preferably used to saturate the inner cotton strip 110 of each tip 104 with acetone. A tip 104, preformed as described above, is placed on each finger of a person where it is desired to remove nail polish, gel polish, or a nail overlay from a natural fingernail. The tips of the invention are wrapped in a stretch fabric that can stretch circumferentially, thereby fitting most fingers. If a finger is small, the fabric may be squeezed together at the base of the tip to create a snug fit and prevent leakage. End portion 109 of each tip 104 is treated with an electrically conductive solution 107 as discussed above with respect to FIG. 8A. While wearing one or more tips, a user may handle and use devices, such as a cell phone with a touch screen, preferably placed in a protective cover as discussed below with respect to FIGS. 9-11. After a sufficient time for nail polish, gel polish, or a nail overlay to be removed from a natural fingernail (e.g., ten to twenty-five minutes), the tips are removed. Alternatively, one or more tips could be removed to determine whether the nail polish, gel polish, or a nail overlay has been removed from a natural fingernail. If nail polish, gel polish, or a nail overlay has not been removed, then the tip may be placed back on its respective nail. Otherwise, if nail polish, gel polish, or a nail overlay has been removed, then all tips 104 may be removed.

Once nail polish, gel nail polish, or a nail overlay is removed from a natural fingernail, tips 104 should be removed and properly disposed of, and not reused, to thereby maintain compliance with mandatory health standards.

Figure 9:
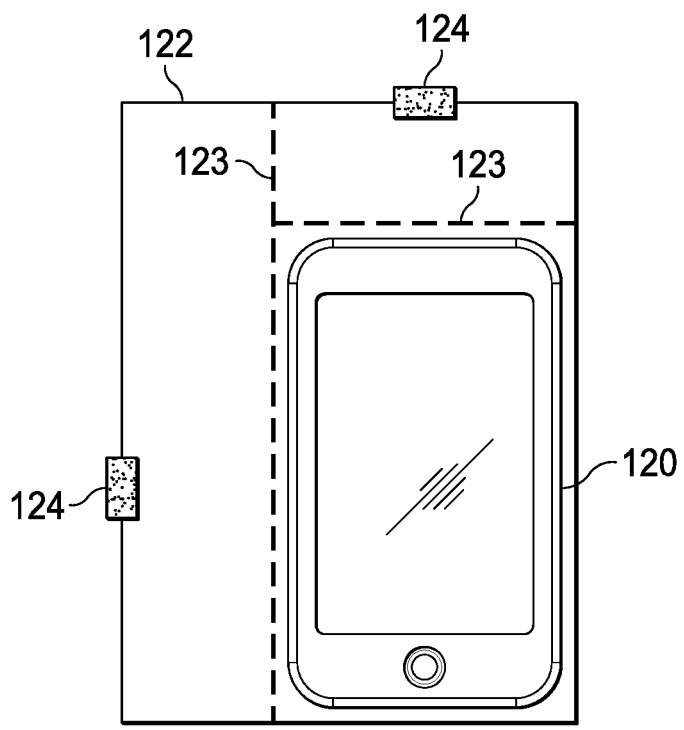
FIG. 9 exemplifies a protective phone cover.
Figure 10:
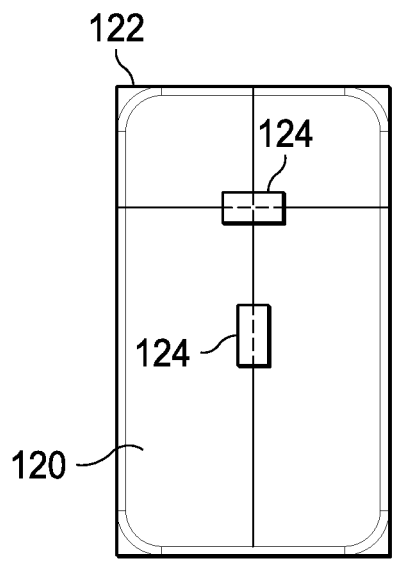
FIG. 10 exemplifies a back-side of a phone completely enveloped in the protective phone cover of FIG. 9.
Figure 11:
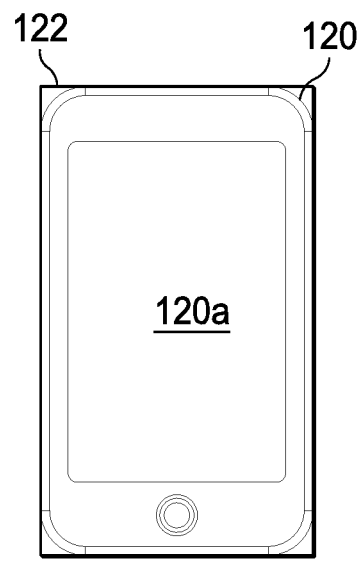
FIG. 11 exemplifies a front-side of a phone completely enveloped in the protective phone cover of FIG. 9.

FIGS. 9-11 depict a protective phone cover 122 configured for protecting a cell phone from nail dust, acetone, and/or getting wet, while nail polish, gel polish, or a nail overlay is removed from a natural fingernail. As shown in FIG. 9, a cell phone 120 is placed in a protective phone cover 122 comprising a clear plastic bag. It is adjustable to fit most phones using stickers 124. Accordingly, excess portions of the bag are folded about lines 123 so that they lay flat on the back side of the phone (FIG. 10). Further to FIG. 10, stickers 124 are applied to the excess bag to secure the bag and create a substantially smooth surface on the phone touch screen 120a of the phone (FIG. 11) and optimal surface to use tips 104.

Figure 12:
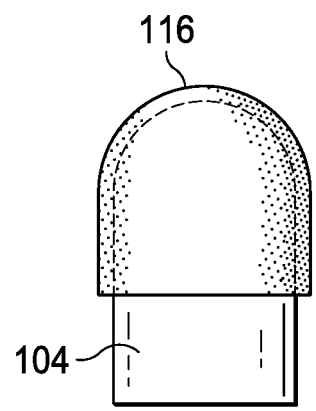
FIGS. 12-13 exemplify an alternate embodiment of the invention using an electrically conductive cap covering an end portion of at least one tip.
Figure 13:
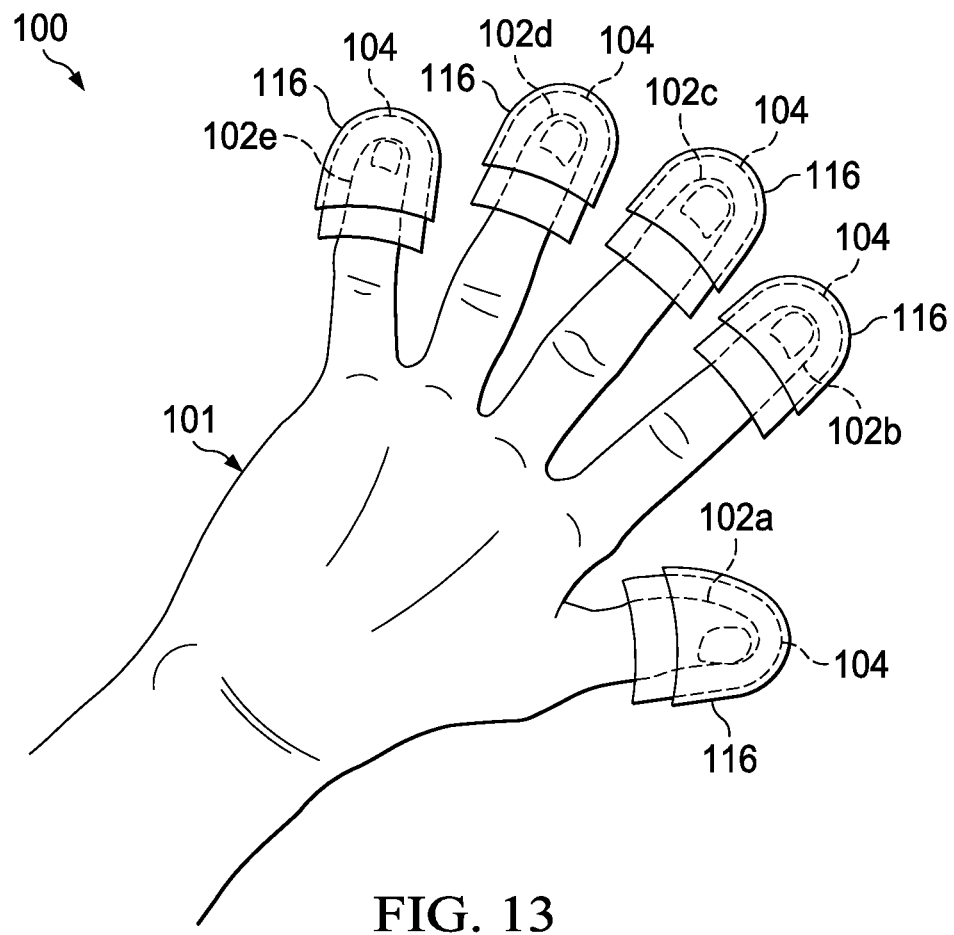

FIGS. 12 and 13 exemplify an alternate embodiment of the invention wherein a stylus tip, referred to herein as a cap, 116 is provided which substantially envelopes a tip 104 like a thimble. Cap 116 is made from an electrically conductive material, such as an electrically conductive rubber or silicon to provide a finger the same effect as a stylus pen. In use, a tip 104, without conducting solution 107, is placed on each nail, as described above. Cap 116 is then placed on each tip 104. FIG. 13 depicts a hand 101 with a cap 116 placed on each finger 102. It is contemplated that the interior of caps 116 may include an absorbent material, obviating the need for fabric 105.

In a further embodiment of the invention, a sock may be made of electrically conductive fabric, like fabric 105 described above, and may be sized and preformed like cap 116, using for example a mold, to fit over cotton and foil already wrapped around a finger.

Figure 14:
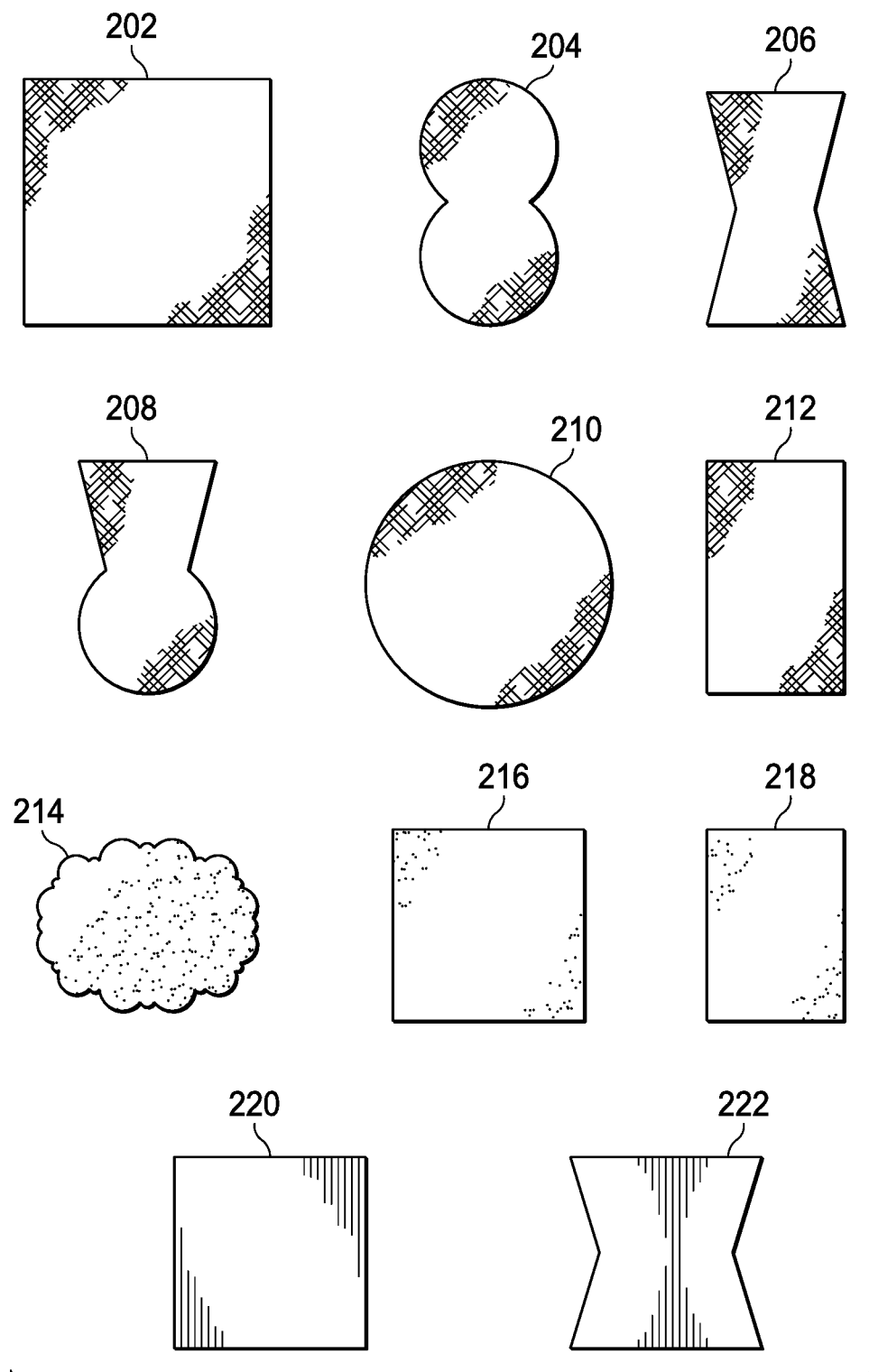
FIG. 14 exemplifies different shapes of adhesive fabric, cotton, and foil that may be used in the making of tips.

FIG. 14 exemplifies, without limitation, different shapes of adhesive fabric 202-212, cotton 214-218, and foil 220-222 that may be used in making tips 104. In one preferred embodiment, fabric 206, cotton 218, and foil 220 are utilized.

Figure 15:
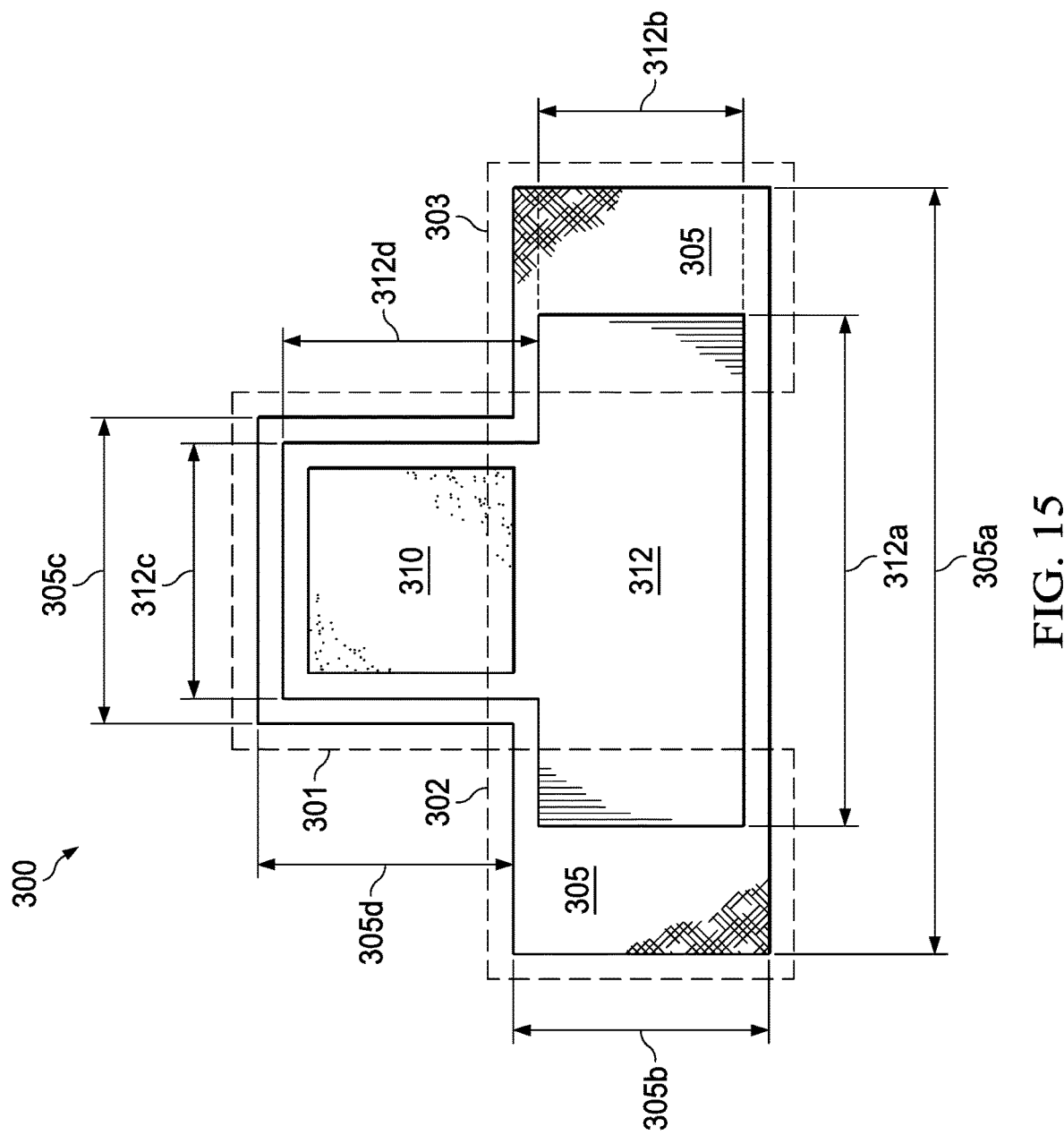
FIG. 15 depicts an alternative embodiment of tips adapted for toes and larger fingers.

FIG. 15 exemplifies an alternative embodiment of tips suitable for toes and large fingers. According to this alternative embodiment, tips, designated by the reference numeral 300, are preferably custom-made as needed, primarily for toes, but also for large fingers. Tips 300 preferably include a cotton strip 310 positioned on (preferably adhered to) tab 301 of aluminum foil 312 positioned on fabric 305, to form a general T shape having tabs 301, 302, and 303. Cotton strip 310 is exemplified, without limitation, by approximate dimensions of 1 inch by 1 inch. Aluminum foil 312 is exemplified, without limitation, by approximate dimensions 312a of about 2 inches, 312b of about 1.25 inches, 312c of about 1.25 inches, and 312d of about 1.25 inches. Fabric 305 is exemplified, without limitation, by approximate dimensions 305a of about 3 inches, 305b of about 1.5 inches, 305c of about 1.5 inches, and 305d of about 1.5 inches.

To use tip 300 of FIG. 15 on a toe, cotton strip 310 is treated with acetone. Then the toe (not shown) is placed on foil 312, between tabs 302 and 303. Tab 301 is then folded over the top of the toenail. Tab 302 is then folded over tab 301 and the fabric portion of tab 302 is stretched and pressed over tab 301 to form a seal thereof. Tab 303 is then folded over tab 302 and the fabric portion of tab 303 is stretched and pressed over tab 302 to form a seal thereof. Tip 300 is removed after a sufficient time (e.g., ten to twenty-five minutes) for standard nail polish, gel polish, or a nail overlay to be removed from a natural toenail.

The invention has numerous possible uses in health, sports, and many other areas. By way of example, but not limitation, in the area of health injuries or conditions, the invention may be used in connection with fingernail injuries, toe injuries, foot injuries, finger injuries, hand injuries, fingernail infections, toe infections, foot infections, finger infections, hand infections, skin injuries, skin infections, ice burn, fungus, fingernail diseases, toe diseases, foot diseases, finger diseases, skin diseases, hand diseases, fingernail syndromes, toe syndromes, foot syndromes, finger syndromes, hand syndromes, fingernail disorders, toe disorders, foot disorders, finger disorders, hand disorders, fingernail conditions, toe conditions, foot conditions, finger conditions, hand conditions, burns, poison ivy, cold fingers, frost bite, bloody nose, acid finger injury, eczema, psoriasis, blisters, calluses, finger cracks, felon, cellulitis, paronychia, herpetic whitlow, pain, pus, redness, stress, discoloration, swelling, bruises, warts, dactylitis (swollen fingers/toes), desquamation (peeling skin), sunburns, dermatitis, inflammation, itchiness, dry skin, avulsion, jammed finger, bites, numbness, deformity, germs, twisted finger, tendons, sprains, laceration, amputation, fracture, dislocation, loss of sensation, weakness, tingling, tenosynovitis, infectious flexor tenosynovitis, deep space infection, contracture, arthritis, hand abscess, digital flexor tendinitis (trigger finger), Kienbock disease, De Quervain syndrome, Raynaud syndrome, finger clubbing, complex regional pain syndrome, birth defects, carpal tunnel syndrome, cubital tunnel syndrome, radial tunnel syndrome, pitted keratolysis, corn, athlete's foot, high arch foot, flatfeet, hammer toes, claw toes, bunions, hallux limitus, ingrown toenail, onychomycosis, subungual exostosis, gangrene, malignant melanoma, plantar fasciitis, peripheral neuropathy, Paget's disease of bone, osteomyelitis, Morton's neuroma, Achilles tendon rupture, bone spurs, Bursitis (joint inflammation), Diabetic neuropathy (nerve damage caused by diabetes), Metatarsalgia, Raynaud's disease, bursitis, and Tarsal tunnel syndrome.

By way of example, but not limitation, in the area of sports injuries or condictions, the invention may be used in connection with air sports, archery, ball games, ball-over-net games, racquet sports, basketball family, bat-and-ball games, baton twirling, gymnastics, cheerleading, dancing, board sports, catch games, climbing, cycling, wrestling, martial arts, combat sports, cue sports, equine sports, fishing, flying disc sports, football, golf, handball family, hunting, ice sports, kite sports, swimming, running, orienteering family, pelota family, remote control, rodeo, sailing, snow sports, shooting sports, stacking, stick and ball games, street sports, tag games, walking, wall-and-ball, aquatic and paddle sports, weightlifting, motorized sports, marker sports, overlapping sports (tennis, polo), board games, athletics (track and field), electronic sports, endurance sports, goal sports, skating sports, strength sports, table sports, target sports, team sports, wind sports, tetherball, and flying disc games.

By way of example, but not limitation, in other areas of injury and health conditions, the invention may be used in connection with keeping moisture on a finger/toe, keeping spa moisture, keeping medicine on a finger/toe, fashion trends, costumes, shoes (protect toes in high heels or unfitting), gardening, sewing, knitting, hot glue gunning, cutting, cooking, bookkeeping, typing (keyboard or device), working gloves, water prevention, dishwashing, animal paws, winter gloves, contaminant protection, writing, reading, drawing, painting, packaging, crafting, photography, driving, laundry, and camping.

The use of the present invention yields a number of advantages over the prior art, including the following:

Tips permit a person, while waiting for nail polish, gel polish, and/or artificial overlays to be removed, to also do various other tasks, such as use a touchscreen device (e.g., cellphone), visit a restroom, pick up and read a magazine, retrieve items from a purse (e.g., gum, mints, gloss, or makeup), and perform basic household functions. A person no longer needs to look at their phone as it rings, or beeps with a message, unable to answer it, as the invention allows full access to their device without fear of damage. With the invention, there is no more dripping, sitting, and waiting with nothing to do.

The protective phone cover protects a phone during the polish/overlay removal process from nail dust, damaging chemicals such as acetone, and/or getting wet. The protective cover is preferably adjustable to custom fit most phones using the stickers provided. The tight-fitted cover creates a smooth surface on the phone screen enabling the tips to easily glide across the phone screen as it protects the phone.

With the provided acetone dropper, a nail technician or home use customer no longer has to expose their skin directly to acetone to saturate the cotton. The dropper provides a direct delivery method to the cotton.

Tips prevent a situation where a nail technician must be interrupted to assist the client with an important phone call or text.

Tips prevent the leakage of acetone down a person's hand, phone, or onto clothes.

Though fingers are wrapped, one may still move them about and not have to ask a nail technician to assist with a phone, or basic functions like brushing hairs out of a face.

Tips do not require any additional foil or cotton from a nail salon, nor the prep time required to cut and pre-size foil and cotton.

Tips allow one to check the progress of one's nails by simply pulling the tips off and placing them back on if more time is needed to soak.

Tips limit a nail technician's exposure to acetone.

Nail salons have a lot of competition. Clients may prefer to have their nails done only at a salon that employs the present invention of tips so that clients will be able to use their phones while getting their nails done, creating an advantage and driving business to the salon.

The time saved by using tips, rather than the laborious task and time spent cutting and tearing cotton and foil, could add up to at least one additional client that each technician could serve per day.

In a busy salon, technicians may not be able to get back to clients immediately after an allotted soak time. The ability of customers to use their phone while waiting on a technician keeps clients occupied and not feeling neglected. Creating a good salon experience assures the client will come back.

The protective phone covers are also disposable and should not be reused due to the nail dust and debris that may accumulate on the cover.

Tips can be used by an individual at home.

Tips add value to the time spent at a salon or at home doing one's own nails.

A technician can easily slide off a tip to check the progress and re-saturate the cotton with a dropper (provided), if needed, without doing damage to the tip. This avoids the need to file off leftover polish/product, which invites damage to the natural nail due to the harshness of the electric file on natural nails.

It is understood that the present invention may take many forms and embodiments. Accordingly, several variations may be made in the foregoing without departing from the spirit or the scope of the invention. For example, where cotton is called for, any suitable absorbent material may be used. Similarly, where aluminum foil is called for, any suitable foil may be used, such as Mylar or Mylar fused with aluminum. In a still further embodiment, a sock may be made of electrically conductive fabric, like fabric 105 described above, and may be sized and preformed like cap 116, using for example a mold simulating the shape and size of a fingertip, to fit over cotton and aluminum foil already wrapped around a finger.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A method for enabling use of a touchscreen device while having nail polish, gel polish, or a nail overlay removed from natural fingernails, the method comprising:
    adhering a cotton strip onto foil;
    wrapping the foil onto a mold simulating a finger, with the cotton strip on an interior side of the foil;
    wrapping fabric around the foil on the mold;
    treating the fabric with an electrically conductive solution to create tip;
    applying acetone to the cotton strip; and
    placing the tip on the finger.

2. The method of claim 1 wherein the fabric is self-adherent fabric.

3. The method of claim 1 wherein the electrically conductive solution comprises aloe vera.

4. The method of claim 1 wherein the electrically conductive solution comprises a polar solvent into which is dissolved an electrolyte.

5. The method of claim 1 wherein the electrically conductive solution comprises a polar solvent into which is dissolved an electrolyte, wherein the polar solvent is water, and the electrolyte is salt.

6. The method of claim 1 wherein the electrically conductive solution comprises a polar solvent into which is dissolved an electrolyte, wherein the polar solvent is water, and the electrolyte is sodium chloride.

7. The method of claim 1 wherein the foil is one of aluminum foil and biaxially-oriented polyethylene terephthalate.

8. The method of claim 1 further comprising forming the treated fabric around the foil on the mold to create a sealed and functional electrical conductive tip.

9. The method of claim 1 further comprising placing a device with a touchscreen in a custom fit plastic cover, to fit most phones.

10. The method of claim 1 wherein the step of applying, acetone to the cotton strip is performed using a dropper.

* * * * *